United States Patent [19]

Haslett, Jr.

[11] Patent Number: 4,770,678
[45] Date of Patent: Sep. 13, 1988

[54] CONTAMINANT REMOVAL FROM FLUIDS

[76] Inventor: John A. Haslett, Jr., P.O. Box 409, Sunset Beach, Calif. 90742

[21] Appl. No.: 935,944

[22] Filed: Nov. 28, 1986

Related U.S. Application Data

[63] Continuation-in-part of Ser. No. 767,726, Aug. 20, 1985, abandoned, which is a continuation of Ser. No. 513,647, Jul. 15, 1983, abandoned.

[51] Int. Cl.$^4$ .............................................. B01D 53/04
[52] U.S. Cl. ........................................ 55/179; 55/208; 55/316; 55/387; 55/389; 55/475; 166/267
[58] Field of Search ...................................... 55/29-31, 55/33, 35, 179, 180, 208, 316, 387, 389, 475; 166/267, 359; 423/231

[56] References Cited

U.S. PATENT DOCUMENTS

| | | | |
|---|---|---|---|
| 917,619 | 4/1909 | Lamb et al. | 55/475 |
| 1,001,683 | 8/1911 | Purtle | 55/475 |
| 1,140,414 | 5/1915 | Steel | 292/256.73 |
| 1,140,420 | 5/1915 | Thomas | 55/475 X |
| 2,014,895 | 9/1935 | Hewitt | 55/503 |
| 2,225,990 | 12/1940 | Henry | 55/387 X |
| 2,586,670 | 2/1952 | Lambertsen | 55/475 X |
| 2,588,296 | 3/1952 | Russell, Jr. | 55/179 X |
| 2,593,132 | 4/1952 | Gannon | 55/387 X |
| 2,665,769 | 1/1954 | Walker et al. | 55/180 X |
| 2,677,438 | 5/1954 | Reid | 55/180 X |
| 2,698,055 | 12/1954 | Williams | 166/267 X |
| 2,771,153 | 11/1956 | Hennig | 55/316 X |
| 2,815,089 | 12/1957 | Turner | 55/179 X |
| 2,880,818 | 4/1959 | Dow | 55/180 X |
| 3,008,540 | 11/1961 | Gibson, Jr. | 55/475 X |
| 3,061,421 | 10/1962 | Landau et al. | 423/231 X |
| 3,087,291 | 4/1963 | Jackson et al. | 55/179 X |
| 3,123,453 | 3/1964 | Loomer et al. | 55/179 X |
| 3,186,148 | 6/1965 | Merrill et al. | 55/387 |
| 3,186,150 | 6/1965 | Zankey | 55/475 X |
| 3,307,335 | 3/1967 | Shomaker | 55/484 |
| 3,483,677 | 12/1969 | Pinto | 55/475 X |
| 3,493,050 | 2/1970 | Kelley et al. | 166/267 |
| 3,509,696 | 5/1970 | Thompson | 55/509 |
| 3,527,027 | 9/1970 | Knight et al. | 55/487 |
| 3,572,008 | 3/1971 | Hankison et al. | 55/33 |
| 3,579,293 | 5/1971 | Shultz et al. | 423/231 |
| 3,594,983 | 7/1971 | Yearout | 55/33 |
| 3,629,995 | 12/1971 | Moten, Jr. et al. | 55/33 |
| 3,672,125 | 6/1972 | Miller | 55/73 |
| 3,678,662 | 7/1972 | Grote | 55/515 X |
| 3,681,899 | 8/1972 | Grote | 55/475 X |
| 3,705,480 | 12/1972 | Wireman | 55/389 X |
| 3,724,177 | 4/1973 | Grote | 55/316 |
| 3,888,644 | 6/1975 | Holland et al. | 55/484 |
| 4,015,959 | 4/1977 | Grote | 55/DIG. 17 |
| 4,029,486 | 6/1977 | Frantz | 55/475 X |
| 4,032,457 | 6/1977 | Matchett | 55/487 |
| 4,177,049 | 12/1979 | Haslett, Jr. | 55/483 |
| 4,303,422 | 12/1981 | Persinger | 55/389 X |
| 4,336,042 | 6/1982 | Frantz et al. | 55/475 X |
| 4,370,150 | 1/1983 | Fenstermaker | 55/16 |
| 4,385,913 | 5/1983 | Lane | 55/387 X |

FOREIGN PATENT DOCUMENTS

| | | | |
|---|---|---|---|
| 869938 | 3/1953 | Fed. Rep. of Germany | 55/475 |
| 2604178 | 8/1977 | Fed. Rep. of Germany | 55/387 |

Primary Examiner—Robert Spitzer
Attorney, Agent, or Firm—William W. Haefliger

[57] ABSTRACT

Apparatus to remove moisture from a natural gas stream includes:
(a) a conduit for a stream of fluid, the stream containing impurities, such as H$_2$O and H$_2$S,
(b) and a filter assembly in communication with the conduit for passing the stream and removing impurities therefrom, the filter assembly including
 (i) a longitudinally elongated barrel and first and second end structures at opposite ends of the barrel,
 (ii) the barrel containing filter material in granular form,
 (iii) the first end structure containing a fluid inlet and a first plenum communicating with the inlet and with the filter material in the barrel, and the second end structure containing a fluid outlet and a second plenum communicating with the outlet and with filter material in the barrel,
 (iv) and structure in the barrel to pressurize the filter material to prevent channeling, such structure for example including one or more pistons in the barrel.

21 Claims, 4 Drawing Sheets

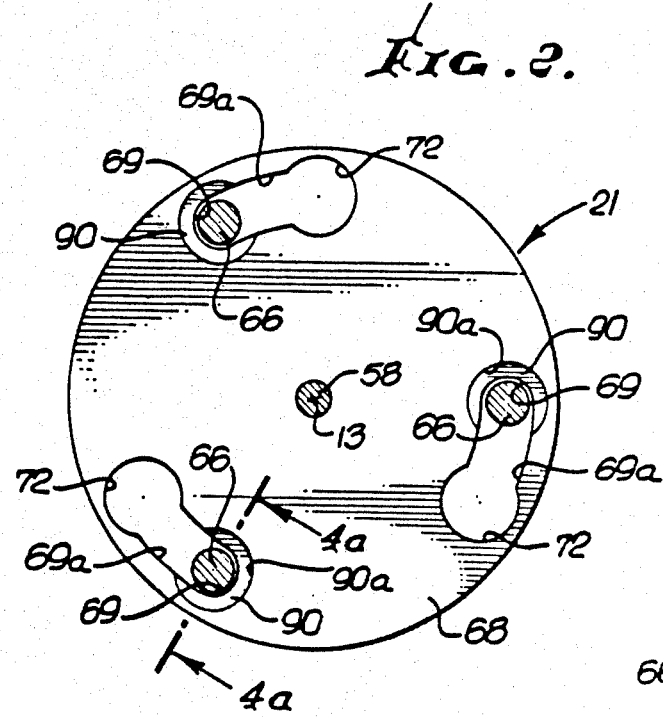
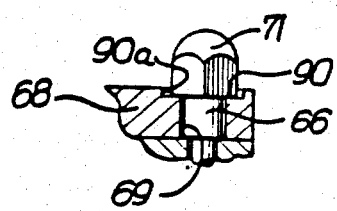
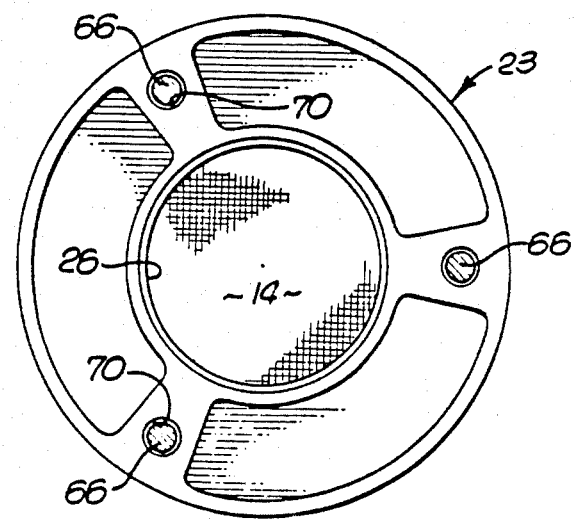
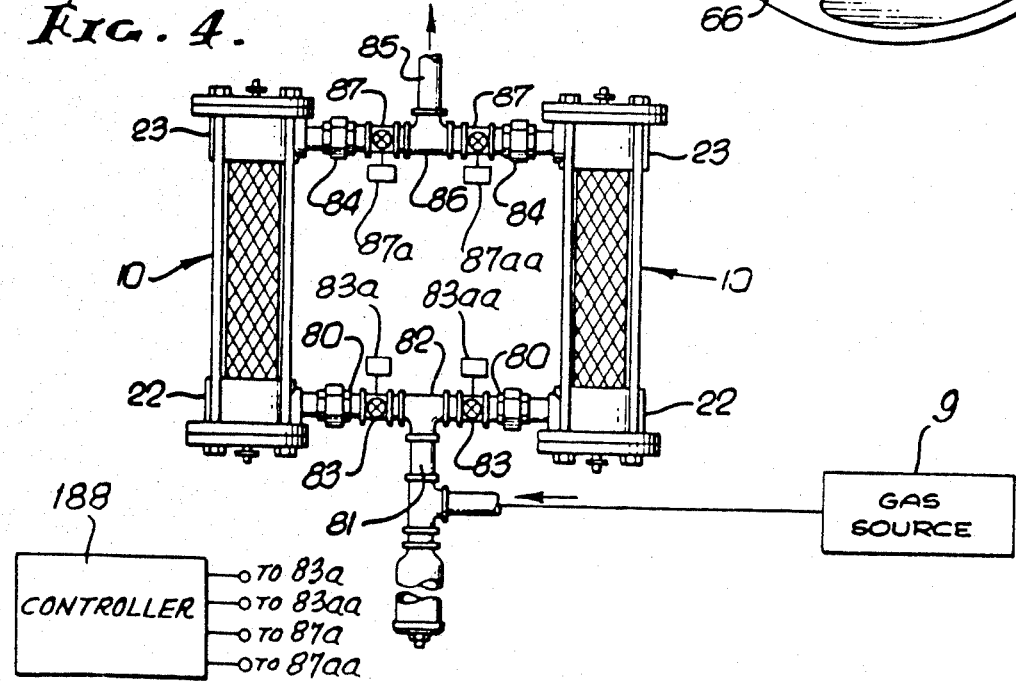

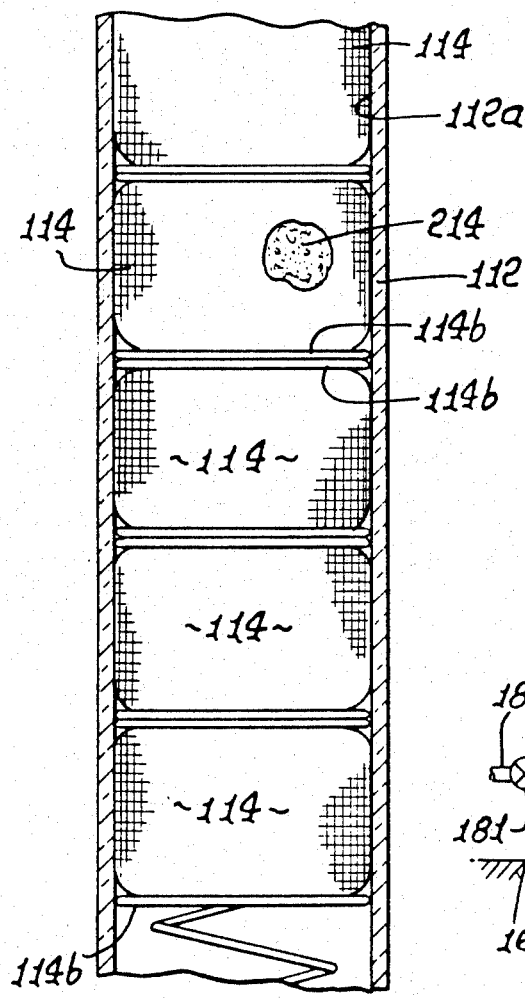
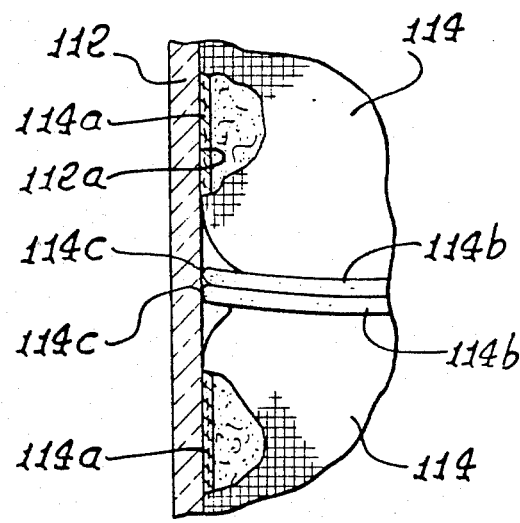
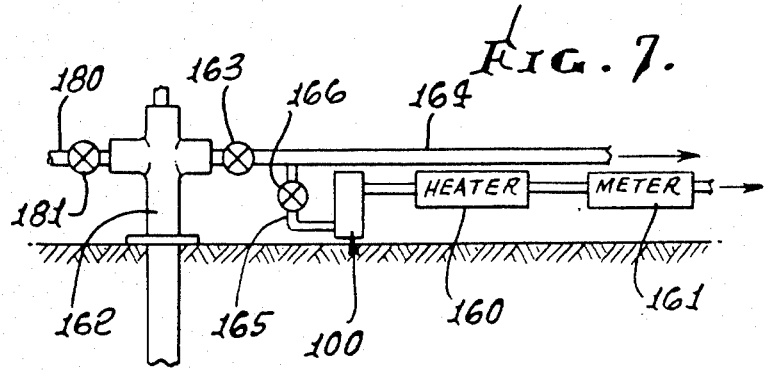
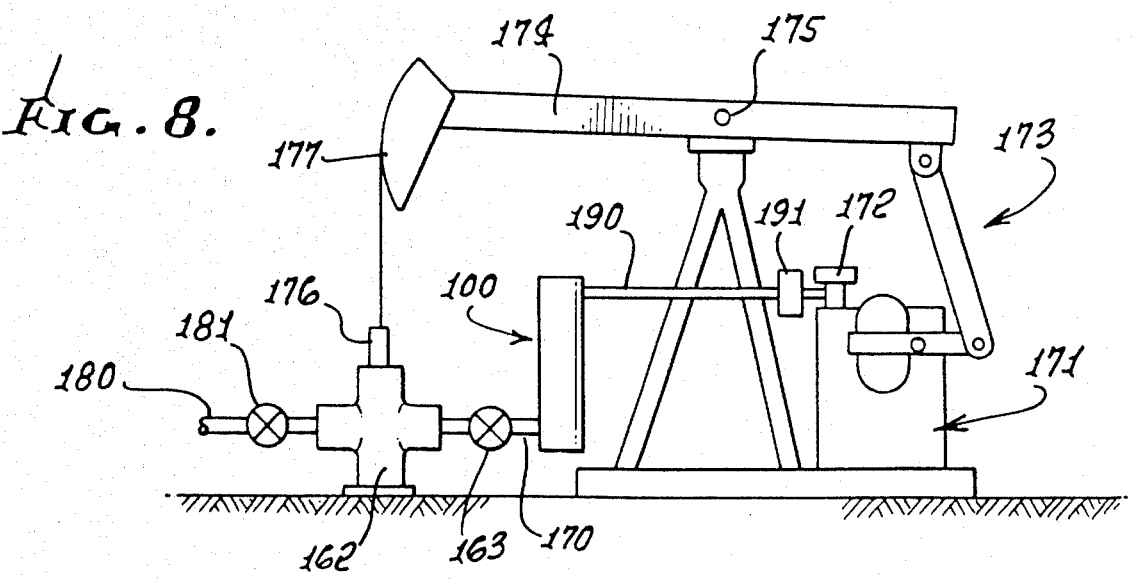

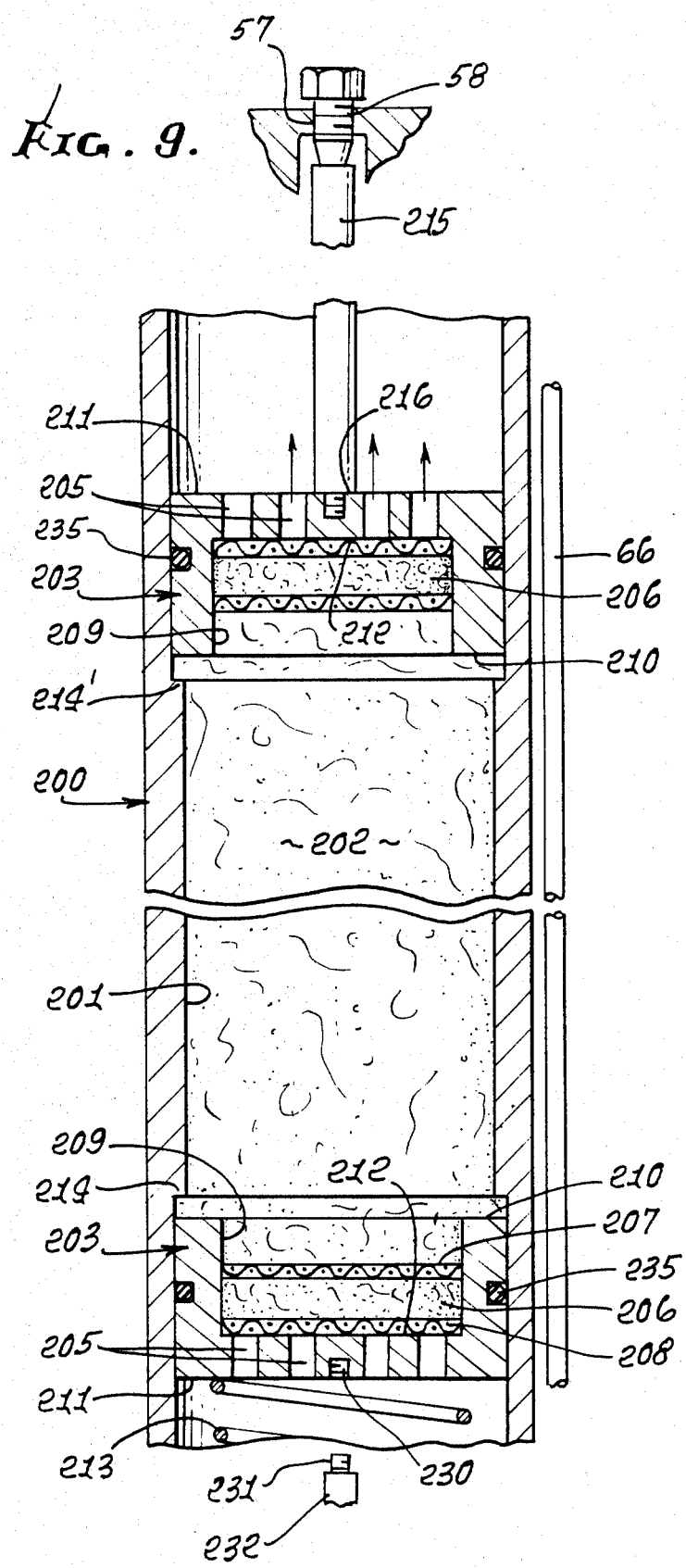
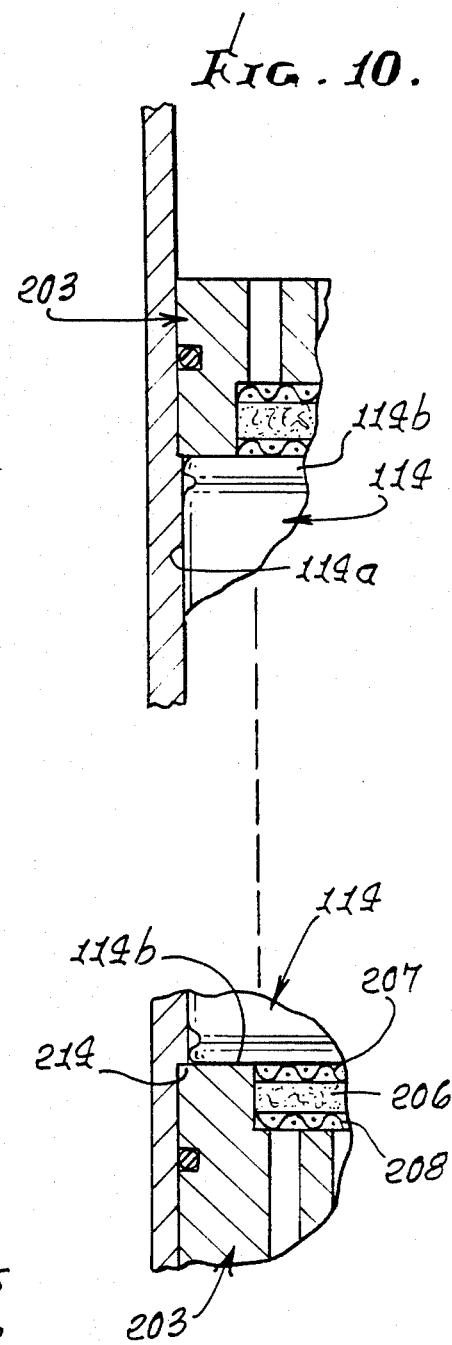

CONTAMINANT REMOVAL FROM FLUIDS

BACKGROUND OF THE INVENTION

This application is a continuation-in-part of Ser. No. 767,726, filed Aug. 20, 1985, which is a continuation of Ser. No. 513,647, filed July 15, 1983 both abandoned.

This invention relates generally to fluid filtering, and more particularly concerns use of a filter assembly for removal of moisture and other contaminants from fluid such as natural gas, for example.

It is well known that fluid such as natural gas contaminated with liquid such as oil and water, and also with particulate matter, presents problems in industrial applications where clean gas is required. These can result in reduced efficiency, incorrect metering, and engine contamination with consequent losses and decreased quality of output.

SUMMARY OF THE INVENTION

It is a major object of the invention to provide improved apparatus characterized as overcoming the above as well as other problems associated with removing moisture and other impurities in natural gas streams. Basically, the assembly comprises:

(a) a conduit for a stream of fluid, the stream containing impurities, such as $H_2O$ and $H_2S$, (b) and a filter assembly in communication with the conduit for passing the stream and removing impurities therefrom, the filter assembly including (i) a longitudinally elongated barrel and first and second end structures at opposite ends of the barrel, (ii) the barrel containing filter material in granular form, (iii) the first end structure containing a fluid inlet and a first plenum communicating with the inlet and with the filter material in said barrel, and the second end structure containing a fluid outlet and a second plenum communicating with said outlet and with filter material in said barrel, (iv) and structure in the barrel to pressurize the filter material to prevent channeling, such structure for example including one or more pistons in the barrel.

In operation, when fluid such as producer gas and impurities enter the filter assembly, most suspended solids in the flow stream are detrained due to loss of velocity in the plenum and a cavity. Gas continues to flow upwardly through the chemically inert absorbing medium, typically filled in bulk into the barrel, or located in several filter cartridges which may be quickly changed, all without removal of the barrel from the flow path. Channeling of gas is eliminated by pressurizing the filter material, as via one or two pistons in the barrel, and/or by spring loading of the filter media; and the filter media does not become clogged with media debris arising from particle oscillation in the air, even though pulsation may exist in the flow stream. Contamination may be visually detected via the transparent barrel, and a safety cage may typically be installed around the latter. Detrained liquids may be easily removed at the lower end of the assembly.

The piston may be structured to provide additional filtering, as well as to position the filter media in the barrel and pressurize it to prevent channeling, and the pistons may move axially, during such positioning.

Further, a perforated filter plate may typically be located at the lower end of the barrel to enchance contaminant removal as via additional diffuser effect, and a liquid coalescing filter may be provided adjacent that plate; the upper end structure may have the same construction as the lower end structure for economy and efficient operation.

As will be seen, the apparatus may include a flow meter and a gas heater connected in series communication with the output of the filter assembly; or an internal combustion engine fuel intake may be connected with the output of the filter assembly. In addition, the multiple containers employed in the filter assembly may contain a molecular sieve for efficient moisture removal; and multiple filter assemblies may be employed as will appear.

These and other objects and advantages of the invention, as well as the details of an illustrative embodiment will be more fully understood from the following specification and drawings, in which:

DRAWING DESCRIPTION

FIG. 2 is a plan view on lines 2—2 of FIG. 1;

FIG. 3 is a plan view on lines 3—3 of FIG. 1;

FIG. 4 is an elevation showing an installation embodying the invention;

FIG. 4a is a section on lines 4a—4a of FIG. 2;

FIG. 6 is a fragmentary view of a barrel containing five improved containers;

FIG. 6a is an enlarged fragmentary section showing the construction of an improved container;

FIG. 7 is an elevation showing moisture removal from well gas being metered;

FIG. 8 is an elevation showing moisture removal from well gas supplied to an engine pumping unit; and FIGS. 9 and 10 are sections, in elevation, showing modification.

DETAILED DESCRIPTION

Figure 1:
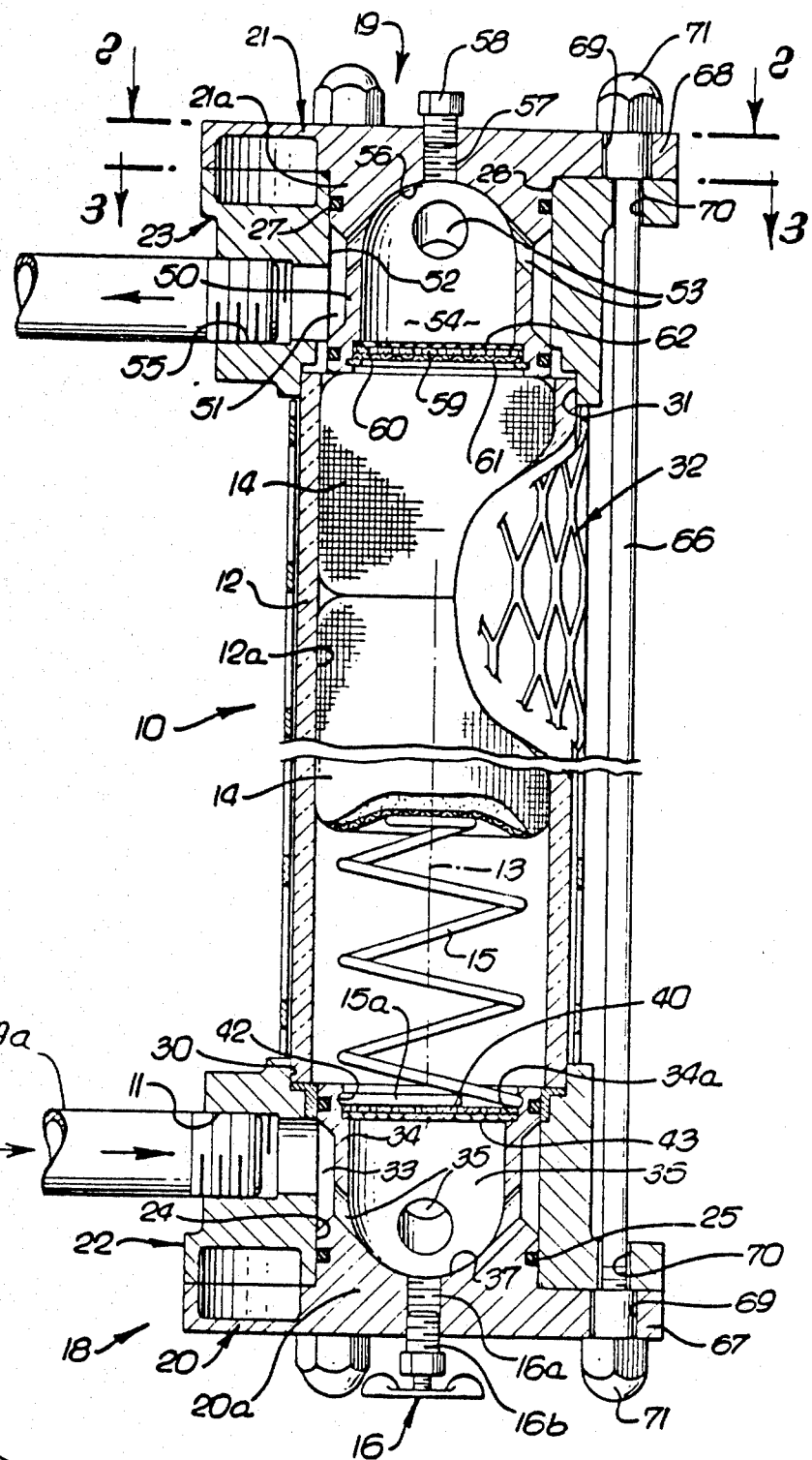
FIG. 1 is a vertical section through a filter assembly embodying the invention.

In the drawings, the filter assembly 10 is employed to remove impurities including moisture from a pressurized natural gas stream, which may for example flow from a source 9 and via conduit 9a to the assembly at inlet port 11. The assembly includes a longitudinally elongated tubular barrel 12 having an axis 13, and which may consist of glass or transparent plastic material, for example. The barrel may alternatively consist of metal such as aluminum, or stainless steel. Accordingly, the status of the filter means within the barrel may be visibly ascertained. Such means typically includes flexible container means containing gas stream filtering media such as a desiccant, as for example a molecular sieve, activated charcoal, activated silica or alumina, or other similar material in granular form. Such material is typically of neutral pH, it absorbs moisture, and is non-deliquescent. The flexible container means may include one or more cartridges as are illustrated at 14.

A coil spring 15 is located in the lower part of the barrel and is axially compressed to urge the cartridges upwardly in the barrel, and acting to expand them against the barrel bore 12a. Accordingly, any trapped water, oil, oil vapor, and/or oil water emulsion drains downwardly from the cartridges to the lowermost extent of the barrel, for ultimate withdrawal, as via a drain 16 to be described. Such drainage can occur when fluid pressure is not transmitted via plenum 33 and opening 35. Also, the action of the spring in expanding the cartridges against bore 12a serves to prevent channeling or by-passing of the gas stream past the filter means. Such channeling could otherwise be produced as by a pulsating gas stream, for example.

The assembly 10 also includes first and second end structures at opposite ends of the barrel, such structures for example being illustrated at 18 and 19. They include end caps designated at 20 and 21, and may include first and second annular bodies 22 and 23 receiving and supporting the end caps, as shown. Body 22 has a bore 24 receiving central portion 20a of cap 20, an annular seal being provided at 25. Similarly, second body 23 has a bore 26 receiving central portion 21a of cap 21, and annular seal is provided at 27 between these elements. The bodies are counterbored at 30 and 31 to telescopically interfit the opposite ends of the barrel 12. A perforated metallic safety cage 32 in cylindrical form may be provided about the barrel, and retained between bodies 22 and 23, to protect against inadvertent shattering of barrel 12.

The first end structure 18 contains an annular plenum, as for example at 33, communicating with inlet 11 in body 22. The plenum is typically formed between bore 24 and an annular wall 34 integral with end cap 20. Wall 34 contains multiple openings 35 angled to pass pressurized gas from the plenum into a central cavity 36 formed in the end cap in longitudinally and axial alignment with the barrel. Typically, the end cap 20 forms a concave interior end wall 37 facing the spring, and the openings 35 are angled radially and longitudinally downwardly toward the wall. Three such openings may be provided at 120° intervals about axis 13, the gas streams flowing through such openings being caused to impinge upon one-another in the cavity and adjacent wall 37, with turbulence, to detrain liquid and solid impurities from such streams prior to their subsequent flow upwardly through the barrel. Essentially, the lower end structure acts as a diffuser for entering gas. As a result, impurities such as moisture droplets, detrained liquid and particles in such liquid may be removed by gravity flow through drain outlet 16a in the cap 20. A drain plug 16b may be removed, periodically, for this purpose.

Figure 5:
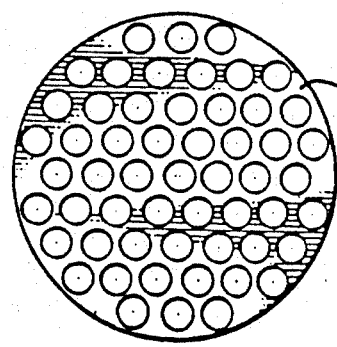
FIG. 5 is a plan view of a perforated disc as embodied in FIG. 1.

A perforated filter plate 40, as for example is seen in FIG. 5, is removably installed to extend transversely across the upward flow path of gas from cavity 36 into the barrel, the plate located proximate the lower end of the spring. Note that the upper end portion of wall 34 may be counterbored at 34a to peripherally receive the plate or disc 40. The lowermost turn 15a of spring 15 may be employed to removably hold the plate in position, that turn being received in a groove 42 in the wall upper end portion. In addition, a liquid coalescing filter 43 may be provided adjacent the plate, as for example at its underside. The filter 43 may be bonded to the underside of the perforated plate 40, and may contain small perforations to pass the gas flow; for example, it may consist of glass fibers, from which water droplets may drain into the cavity.

The second end cap 21 and body 23 may correspond to, or be like, cap 20 and body 22, whereby they may be interchangeable, for simplicity of construction and assembly. Accordingly, the cap 21 defines an annular wall 50 projecting within a hollow interior formed by body 23, there being an annular plenum 51 formed between wall 50 and body bore 52. Multiple openings (as for example three) 53 through wall 51 pass gas from cavity 54 to the plenum from which gas flows to outlet 55 in body 23. Openings 53 are angled radially and longitudinally away from the concave end wall 56. Axial port 57 communicating with wall 56 is plugged at 58.

Perforated disc or plate 59, corresponding to plate 40, is received in counterbore 60 in the lower extent of wall 50; and a wire mesh screen 61 may be located adjacent the plate at its underside. These elements trap any solid impurities or particles that may escape from the filter cartridges 14. In addition, a micron filter 62 may be located adjacent the upper side of the disc 59 to trap very small particles, i.e. of micron size.

Also shown in FIG. 1 are tie members 66 extending longitudinally outwardly of the barrel, and interconnecting flanges 67 and 68 integral with the end caps. The tie rods are spaced at equal intervals about the axis 13, and project through openings 69 in the flanges and also through openings 70 in the bodies 22 and 23. As seen in FIG. 2, the openings 69 are circularly elongated at 69a, whereby the flanges and associated end caps may be rotated about axis 13, into positions whereby enlarged heads 71 on the tie members are in registration with enlarged openings 72 in the flanges. Openings 72 are sized to axially pass the heads, permitting removal of the rotated end caps, for replacement of the filter cartridges, all without disturbing the assembly of the bodies 22 and 23 to the barrel. The end caps may then be replaced and rotated back into positions wherein the tie members extend in openings 69. The heads 71 at the lower ends of the tie members may be thread connected to the tie members to be tightened against the lower end cap, or loosened to permit removal of that cap.

FIG. 4 shows two filter assemblies 10 as described, extending in upright, parallel relation. First branch pipes 80 interconnect the gas inlets; and supply piping 81 from natural gas source 9 is connected with pipes 80 via a tee 82. Valves 83 in branches 80 control flow to the assemblies 10. Likewise, second branch pipes 84 interconnect the gas outlets from the asesemblies 10; and delivery piping 85 is connected to branches 84 via tee 86. Valves 87 in branches 84 control flow therethrough. Such an installation is of particular advantage in that either assembly 10 may be employed, or taken out of the flow stream by manipulation of valves 83 and 87 for replacement of its filter cartridges, while the other assembly remains in use. Note that the connections of the bodies 22 and 23 to the branch pipes remain undisturbed while cartridge replacement is effected. Controls for valves 83 are indicated at 83a and 83aa, and for valves 87 are indicated at 87a and 87aa.

FIGS. 2 and 4a show that the flange 68 defines shallow recesses 90 at the ends of the elongated openings 69a remote from the enlarged openings 72. Such recesses act to retain the heads (i.e. castellated nuts) preventing inadvertent relative rotation of the flange and tie rods. It is only after the flange 68 is urged toward the opposite flange 67 that the heads clear the shallow shoulders at 90a to permit escape of the heads from the recesses, allowing such relative rotation.

Turning to FIG. 6, a barrel 112 (corresponding to barrel 12) receives five containers 114 of the construction shown in FIG. 6a. Each container includes a cylindrical porous side wall 114a, and opposite end walls 114b. The circular periphery of each end wall 114b is stitched to the rim of the side wall, to form an annular bead indicated at 114c. Thus, the beads engage the barrel bore 112a, and end walls 114b of successive containers flatly engage one another throughout their areal extents so that a maximum of space in each container is available for reception of moisture absorbent material indicated at 214, and filling each container so as to have cylindrical shape.

At least about five such containers are included in the barrel, so that the proportional contents of the container may be selective adjusted and varied to provide near optimum control of moisture and other contaminant removal from the natural gas stream. Thus, two or three of the containers typically and preferably contain a molecular sieve, of particle size between 3 and 4 Angstroms; and the remaining containers typically contain activated charcoal, activated alumina or activated silica.

FIG. 7 shows the device 100 (incorporating containers as in FIG. 4, for example) connected in series with a gas heater 160 and a gas meter 161, used for metering in cold climates. Gas from the well production piping 162 flows via valve 163 to a delivery line 164. A branch line 165 conducts a side stream of the cold gas (via a valve 166) to the inlet port 11 of the apparatus 100 (corresponding to filter apparatus 10), and after moisture is removed in apparatus 100 the gas flows to the heater and meter. Accordingly, a more accurate measurement of actual gas production flow is thereby obtainable. Alternatively the gas may be heated before moisture is removed by apparatus 100. The gas is producer gas containing, typically, $H_2O$, and particulate.

FIG. 8 shows the apparatus 100 connected in series with a conduit 170 delivering producer or natural gas (such as methane) to an internal combustion engine 171. Gas (under pressure) from the well production piping 162 flows via valve 163 to delivery line 170 connected to input port 11 of apparatus 100. The output 55 is in turn connected via line 190 and pressure regulator 191 with the engine carburetor 172, whereby decontaminated natural gas is supplied to the engine. The latter drives well pumping unit 173 including walking beam 174, pivoted at 175, and to which a pump rod 176 is connected via horse head 177.

In FIGS. 7 and 8, line 180 at the well head may be utilized to flow petroleum from the well, via valving 181. Also in these views, units designated at 100 may be replaced by the dual units of FIG. 4, connected in parallel. Valves 83 and 87 may be provided with suitable drives 83a and 87a, as shown, and those drives automatically operated or energized via a controller 188. Thus, the controller may maintain closure of valves 83 and 87 associated with one unit 10 (of the type shown in FIG. 6) while the valves 83 and 87 associated with the other unit are maintained open; and after a pre-selected time corresponding to use-up of the moisture absorbing capacity of a unit, the valve positions may be reversed. This facilitates replacement of the cartridges of the unit whose moisture capacity has been used up; and if desired the units may both be operated and in parallel to extend the capacity use-up time.

Sources of the material in the containers 114 are:

| MATERIAL | COMMERCIAL NAME | SOURCE |
| --- | --- | --- |
| molecular sieve | 4A, and 5A 13X | Davison div. of W. R. Grace Co. Union Carbide Corp. |
| activated alumina | | ALCOA Chemical |
| activated silica | | W. R. Grace Co. |

-continued

| MATERIAL | COMMERCIAL NAME | SOURCE |
| --- | --- | --- |
| activated carbon or charcoal | | Calgon Corp, and West States Carbon |
| ferric oxide | | U.S. Steel Corp. |

In the above, ferric oxide in one or more containers, removes $H_2S$ from the producer gas.

The filter assembly shown in FIG. 9 is adapted to remove impurities from a pressurized fluid stream, and it includes a longitudinally elongated barrel 200, and first and second end structures (not shown, but like those seen in FIG. 1) at opposite ends of the barrel, those structures including end caps. Elongated tie members 66 are spaced about the barrel and removably interconnecting the end caps which are removable from the barrel after disconnection of the caps from said tie members, as described above.

The barrel has a bore 201 and there is flowable particle filter material 202 in the barrel, as for example filled in bulk at 202 within the barrel to contact the bore 201. At least one piston 203 is located in the barrel and slidably positioned along the barrel bore relative to said end caps to position the particle filter material therein. The piston is easily removable from the barrel after removal of at least one end cap from the barrel, thereby to facilitate quick removal of the filter material. Two such pistons are shown, at opposite ends of the filter material, to position such material; to compress it, and to prevent channeling of the filter material.

Each piston includes multiple through openings 205 to pass the fluid stream through the pistons, and fibrous filter material 206 (as for example a cotton pad) is carried by the piston in registration with the through openings 205. The pad 206 and retaining screens 207 and 208 at opposite side of the pad, are received and retained in a recess 209 sunk in the face 210 of each piston. Openings 205 extend between piston end face 211 and bottom wall 212 of the recess. The pad fibers filter out loose material from the fluid stream, and also loose material formed upon degeneration of the filter media beads, to prevent entrainment of such loose (dusty) particles in the fluid (as for example gas) or stream leaving the filter apparatus.

In the example, a compression spring 213, like that at 15 in FIG. 1, urges the lower piston 203 upwardly, as toward a limit shoulder 214 in the bore; and the upper piston is positioned in the bore so that the filter media 202 is compressed between the pistons, to prevent channeling. In addition, the upper piston can be adjusted downwardly as by a rod 215 engaging the top of the upper piston at 216. The set screw 58 may be turned to advance it downwardly in the thread 57 in the upper cap 21, to push rod 215 downwardly, to increase the compaction of the filter media. This is desirable after degradation of the filter media, in use, and also to prevent or stop channeling of the filter media.

The construction in FIG. 10 is the same as in FIG. 9, except that filter media cartridges 114 are employed, in the barrel, between the pistons 203. The description of the cartridges is the same as above, including FIGS. 6 and 6a, and they are compressed as by spring 213, and/or the rod 215, and the piston.

Shoulders 214 and 214' in the bore provide limits to piston endwise displacement. In FIG. 10, the lower piston is shown engaging shoulder 214. A threaded opening 230 in each piston is attachable to threaded end 231 of a retrieval stem 232, for quickly pulling the piston from the bore, to enable change of the filter media. O-rings 235 on each piston engage the bore to prevent fluid by-passing the pistons.

I claim:

1. In a filter assembly to remove impurities from a pressurized fluid stream, the combination comprising:
   (a) a longitudinally elongated barrel, first and second end structures at opposite ends of the barrel, said structures including end caps, and elongated tie members spaced about the barrel and removably interconnecting said end caps which are removable from the barrel after disconnection of the caps from said tie members,
   (b) the barrel having a bore and there being flowable particle filter material in the barrel,
   (c) at least one piston in the barrel and slidably positioned along the barrel bore relative to said end caps to position the particle filter material therein, the piston being easily removable from the barrel after removal of a least one end cap from the barrel,
   (d) there being multiple through openings in the piston to pass the fluid stream, and there being a fibrous filter carried by the piston in registration with said through openings, the piston having a peripheral surface and there being sealing means sealing off between the piston peripheral surface and the barrel bore, the fibrous filter carried by the piston being everywhere spaced radially inwardly from said piston peripheral surface and from said sealing means to receive compressive force transmitted via said particle filter material,
   (e) the first end structure containing a fluid inlet and a plenum communicating with said inlet and in registration with one end of the barrel, and the second end structure containing a fluid outlet and a plenum communicating with said outlet and in registration with the opposite end of the barrel,
   (f) there being screens carried by the piston at opposite sides of said fibrous filter material to retain same, the piston forming a recess sunk in one end thereof to receive the screens and said fibrous material,
   (g) there being adjustable means to adjust the position of the piston in the barrel bore,
   (h) and including shoulder means in the barrel bore and directly exposed to the piston to limit piston compression of the particle filter material.

2. The combination of claim 1 including a second piston in the barrel and slidably positioned along the barrel bore to position and pressurize the particle filter material, the second piston also being easily slidably removable from the barrel bore after said end cap removal, there being multiple through openings in the second piston to pass the fluid stream, and said pistons located at opposite ends of the filter material in the barrel, the second piston having a peripheral surface and there being second sealing means sealing off between the second piston peripheral surface and the barrel bore, and there being a second fibrous filter carried by the second piston in registration with said through opening in the second piston, the second fibrous filter everywhere spaced radially inwardly from said second piston peripheral surface and from said second sealing means to receive compressive force transmitted via said particle filter material.

3. The combination of claim 2 including a compression spring in the barrel compressively urging one of the pistons toward and against the filter material.

4. The combination of claim 2 wherein said filter material particles are directly filled into the barrel, to contact the barrel bore and said fibrous filters carried by said pistons, the filter material particles compressed between said pistons.

5. The combination of claim 2 wherein said filter material particles are contained within multiple flexible, porous containers located within the barrel, the fibrous filter carried by said pistons endwise engaging two of said containers, the containers having side walls in engagement with the barrel bore.

6. The combination of claim 1 including
   (i) a conduit for a stream of fluid containing impurity selected from the group consisting of $H_2O$ and $H_2S$,
   (j) and said filter assembly including multiple flexible and porous containers containing said particle filter material selected from the group consisting of moisture-absorbing material in granular form and $H_2S$-absorbing material, said containers stacked in the barrel bore throughout substantially the entireties of the container sides, each of the containers having a flexible and porous side wall and flexible and porous end walls, the end walls having peripheral and annular bead connections projecting radially, free of said side walls and having radially outwardly convex surfaces extending generally radially outwardly and engaging the barrel, the end walls and beads of successive containers being in flat interengagement throughout substantially the entireties of their areal extents facing endwise, the side walls of the containers also engaging the barrel and extending directly beneath radially outermost annularly open space between said side walls of the container in engagement with the barrel and said outermost convex surfaces of the beads.

7. The combination of claim 6 including a gas flow meter and a gas heater connected in series communication with said filter assembly.

8. The combination of claim 6 including an internal combustion engine having an intake receiving said gas from the filter assembly outlet for combustion in the engine, and a well pumping unit driven by the engine.

9. The combination of claim 6 wherein there are at least two of said flexible containers in the barrel, the moisture absorbing material in at least one container comprising a molecular sieve.

10. The combination of claim 9 wherein there are at least four of said containers in the barrel, the $H_2S$ absorbing material in at least one of the containers comprising ferric oxide.

11. The combination of claim 10 wherein the remaining container or containers in the barrel contain materials selected from the group that includes activated charcoal, activated alumina, activated silica, and ferric oxide.

12. The combination of one of claims 9 or 10 wherein the molecular sieve includes sieve particles having size of between about 3 and 4 Angstroms.

13. The combination of claim 9 wherein the remaining container or containers in the barrel contain materials selected from the group that includes activated charcoal, activated alumina, activated silica, and ferric oxide.

14. The combination of claim 6 including a second piston in the barrel and slidably positioned along the barrel bore to position and pressurize the particle filter material, there being multiple through openings in the second piston to pass the fluid stream, and said pistons located at opposite ends of the filter material in the barrel.

15. The combination of claim 14 wherein end walls of successive containers are in flat interengagement.

16. The combination of claim 14 including a compression spring located within the barrel between one of said end structures and one of said pistons to pressurize said containers and the material therein.

17. The combination of claim 6 wherein the first plenum is annular, there being an annular wall containing openings via which the plenum communicates with a cavity in endwise alignment with the barrel interior, the openings angled to pass pressurized gas from the plenum to the cavity in sub-flow streams caused to impinge upon one another and turbulently mix to detrain liquid and solid impurities from the gas prior to flow thereof through the filter material in the barrel.

18. The combination of claim 17 including a compression spring located between said first end structure and the piston to exert endwise pressure thereon as well as on others of said containers.

19. The assembly of claim 18 wherein said first end structure forms a concave interior wall facing said spring, openings in an annular wall angled transversely and longitudinally toward said concave interior wall.

20. The combination comprising:
  (x) two filter assemblies as defined in claim 6, said assemblies extending in upright parallel relation, said second end structures being hollow and defining fluid stream outlets,
  (y) first branch piping interconnecting said gas inlets defined by the first end structures, supply piping connected with said first branch piping at a first tee, and valves in said first branch piping between said first tee and said fluid inlets, and
  (z) second branch piping interconnecting said gas outlets defined by the second end structures, delivery piping connecting with said second branch piping between said tee and said fluid outlets.

21. The combination comprising:
  (x) two filter assemblies as defined in claim 6,
  (y) and control means to control the alternate operative connection of said assemblies with said conduit.

* * * * *